[19] United States Patent
Bar-Niv et al.

(10) Patent No.: US 8,886,852 B2
(45) Date of Patent: Nov. 11, 2014

(54) TECHNIQUES FOR ACHIEVING COMPLETE INTEROPERABILITY BETWEEN DIFFERENT TYPES OF DATA AND MULTIMEDIA INTERFACES IN HANDHELD DEVICES

(75) Inventors: Amir Bar-Niv, Sunnyvale, CA (US); Ziv Kabiry, Kfar Saba, IL (US); Yaron Slezak, Ra'anana, IL (US)

(73) Assignee: Cadence Design Systems, Inc., San Jose, CA (US)

( * ) Notice: Subject to any disclaimer, the term of this patent is extended or adjusted under 35 U.S.C. 154(b) by 30 days.

(21) Appl. No.: 13/312,514

(22) Filed: Dec. 6, 2011

(65) Prior Publication Data
US 2012/0079140 A1 Mar. 29, 2012

Related U.S. Application Data

(63) Continuation-in-part of application No. 12/558,673, filed on Sep. 14, 2009.

(60) Provisional application No. 61/425,546, filed on Dec. 21, 2010, provisional application No. 61/448,489, filed on Mar. 2, 2011.

(51) Int. Cl.
*G06F 13/00* (2006.01)
*H04N 11/02* (2006.01)
*G09G 5/00* (2006.01)
*G06F 3/14* (2006.01)

(52) U.S. Cl.
CPC *G06F 3/14* (2013.01); *G09G 5/006* (2013.01); *G09G 5/005* (2013.01); *G09G 2330/021* (2013.01); *G09G 2370/04* (2013.01); *G09G 2370/10* (2013.01); *G09G 2370/12* (2013.01)
USPC .......................................... 710/16; 348/425.1

(58) Field of Classification Search
CPC ................................ G06F 3/00; G06F 11/3051
USPC ............................................................ 710/16
See application file for complete search history.

(56) References Cited

U.S. PATENT DOCUMENTS 7,572,143 B2   8/2009   Harris
7,611,367 B2   11/2009  Lee
7,677,925 B2*  3/2010   Chuang .................... 439/607.25

(Continued)

OTHER PUBLICATIONS

United States Office Action of U.S. Appl. No. 12/558,673 dated Jun. 22, 2012.

(Continued)

*Primary Examiner* — Titus Wong
(74) *Attorney, Agent, or Firm* — Pearl Cohen Zedek Latzer Baratz LLP

(57) ABSTRACT

A triple-mode connectivity apparatus for enabling interoperability between a multimedia display interface and a data interface. The apparatus comprises a universal connector installed in a first device and structured to enable connectivity between the multimedia display interface and the data interface of a second device, the first device is connected to the second device using a cable having a first connector compliant with the universal connector and a second connecter compliant with the data interface of the second device; a physical layer interface for processing signals compliant with the multimedia display interface and the data interface; and a detector for detecting an interface type of the second device and setting the apparatus to process signals according to the determined interface type.

16 Claims, 4 Drawing Sheets

(56) References Cited

U.S. PATENT DOCUMENTS

| | | |
|---|---|---|
| 7,788,412 B2 | 8/2010 | Guo |
| 7,835,382 B2 * | 11/2010 | Lida et al. .................... 370/437 |
| 7,918,689 B2 | 4/2011 | Sloey et al. |
| 8,200,855 B2 | 6/2012 | Goodart |
| 8,242,803 B2 | 8/2012 | Wu |
| 2002/0038432 A1 | 3/2002 | Hsu |
| 2008/0201756 A1 | 8/2008 | Shakiba et al. |
| 2008/0205519 A1 | 8/2008 | Goodart et al. |
| 2008/0298504 A1 | 12/2008 | Lee |
| 2009/0074040 A1 * | 3/2009 | Lida et al. .................... 375/220 |
| 2009/0115911 A1 | 5/2009 | Lida et al. |
| 2009/0116547 A1 | 5/2009 | Lida et al. |
| 2009/0116548 A1 | 5/2009 | Lida et al. |
| 2009/0116583 A1 | 5/2009 | Lida et al. |
| 2009/0142969 A1 | 6/2009 | Chuang |
| 2009/0147864 A1 | 6/2009 | Lida et al. |
| 2009/0177901 A1 | 7/2009 | Chen |
| 2009/0179883 A1 | 7/2009 | Goodart |
| 2009/0231485 A1 * | 9/2009 | Steinke .................... 348/425.1 |
| 2009/0300243 A1 * | 12/2009 | Chao .................... 710/71 |
| 2010/0079475 A1 | 4/2010 | Whitby |
| 2010/0128182 A1 | 5/2010 | Ichimura |
| 2010/0268860 A1 | 10/2010 | Nikazm |
| 2010/0328540 A1 | 12/2010 | Wu |
| 2011/0093623 A1 | 4/2011 | Chen |
| 2011/0167176 A1 | 7/2011 | Yew |
| 2012/0076296 A1 * | 3/2012 | Graunke .................... 380/205 |
| 2012/0196475 A1 | 8/2012 | Lin |
| 2012/0320546 A1 | 12/2012 | Wu |

OTHER PUBLICATIONS

United States Final Office Action of U.S. Appl. No. 12/558,673 dated Feb. 21, 2013.
United States Office Action of U.S. Appl. No. 12/558,673 dated Jul. 25, 2013.
United States Final Office Action of U.S. Appl. No. 12/558,673 dated Apr. 25, 2014.
United States Office Action of U.S. Appl. No. 13/312,457 dated Jun. 21, 2013.
United States Final Office Action of U.S. Appl. No. 13/312,457 dated Feb. 26, 2014.
United States Office Action of U.S. Appl. No. 13/852,559 dated May 22, 2014.

* cited by examiner

TECHNIQUES FOR ACHIEVING COMPLETE INTEROPERABILITY BETWEEN DIFFERENT TYPES OF DATA AND MULTIMEDIA INTERFACES IN HANDHELD DEVICES

CROSS REFERENCE TO RELATED APPLICATIONS

This application claims priority from U.S. provisional patent application No. 61/425,546, filed on Dec. 21, 2010 and U.S. provisional application No. 61/448,489 filed Mar. 2, 2011. This application is also a continuation-in-part of Ser. No. 12/558,673 filed Sep. 14, 2009. The above-referenced applications are hereby incorporated by reference for all that they contain.

TECHNICAL FIELD

This invention generally relates to the connectivity of handheld devices and electronic display devices.

BACKGROUND OF THE INVENTION

The high-definition multimedia interface (HDMI) is a compact audio/video connector interface for transmitting uncompressed digital streams. The HDMI connects a digital multimedia (or audio/video) source (e.g., a set-top box, a DVD player, a personal computer, a video game console, etc.) to a compatible digital sink, such as a digital television. The HDMI is fully described in the HDMI Specification version 1.4a published on Mar. 4, 2010, incorporated herein by reference in its entirety merely for the useful understanding of the background of the invention.

A HDMI cable is a transport medium including three transition minimized differential signaling (TMDS®) channels utilized to transfer video, audio, and auxiliary data encapsulated in TDMS characters; the transmission is synchronized using a high-frequency clock signal running over a clock channel. The TDMS and clock channels are differential pairs. A HDMI cable also includes the following channels: a display data channel (DDC_SCL and DDC_SDA), a consumer electronics control (CEC), and a hot-plug detect (HPD) signal which originates at the sink. The HDMI interface is implemented using a HDMI cable and connectors, each of which includes 19 pins. A source and sink connector have the same configuration. Table 1 lists the pins in a type A HDMI connector (either a source or sink).

TABLE 1

| Pin Number | HDMI_Signal |
| --- | --- |
| 1. | TMDS_Data2+ |
| 2. | Shield |
| 3. | TMDS_Data2− |
| 4. | TMDS_Data1+ |
| 5. | Shield |
| 6. | TMDS_Data1− |
| 7. | TMDS_Data0+ |
| 8. | Shield |
| 9. | TMDS_Data0− |
| 10. | TMDS_Clk+ |
| 11. | Shield |
| 12. | TMDS_Clk− |
| 13. | CEC |
| 14. | Utility/HEAC+ |
| 15. | SCL |
| 16. | SDA |
| 17. | DDC/CEC/Ground |

TABLE 1-continued

| Pin Number | HDMI_Signal |
| --- | --- |
| 18. | +5 V |
| 19. | HPD/HEAC− |

DisplayPort™ is a standard that defines a digital display interface of a new digital audio/video interconnect. The DisplayPort is intended to be used primarily between a computer and its display monitor, or a computer and a home-theater system. The DisplayPort standard is fully described in the DisplayPort Specification Version 1.2 published Jan. 5, 2010, by the Video Electronics Standards Association (VESA), incorporated herein by reference in its entirety merely for the useful understanding of the background of the invention.

Transport channels of a DisplayPort interface include a main link, an auxiliary channel (AUX), and a hot plug detect (HPD). The main link is a unidirectional channel that allows data transfers over up to 4 lanes that carry clock signals in addition to the video/audio streams. Each lane is an AC-coupled differential pair. The auxiliary channel is a bi-directional half-duplex channel that carries control and management information and the HPD channel is used by a sink device to interrupt a source device when a plug is connected or disconnected. The DisplayPort interface is facilitated using a proprietary cable and connectors, each of which includes 20 pins. The DisplayPort cable is a cross cable, i.e., each of a source and sink connector has a different configuration. Table 2 lists the pins and their signals of source and sink DisplayPort connectors.

TABLE 2

| Pin Number | DisplayPort Source | DisplayPort Sink |
| --- | --- | --- |
| 1. | ML_lane0P | ML_lane3N |
| 2. | GND | GND |
| 3. | ML_lane0N | ML_lane3P |
| 4. | ML_lane1P | ML_lane2N |
| 5. | GND | GND |
| 6. | ML_lane1N | ML_lane2P |
| 7. | ML_lane2P | ML_lane1N |
| 8. | GND | GND |
| 9. | ML_lane2N | ML_lane1P |
| 10. | ML_lane3P | ML_lane0N |
| 11. | GND | GND |
| 12. | ML_lane3N | ML_lane0P |
| 13. | Config1 | Config1 |
| 14. | Config2 | Config2 |
| 15. | AUX_CHP | AUX_CHP |
| 16. | GND | GND |
| 17. | AUX_CHN | AUX_CHN |
| 18. | HPD | HPD |
| 19. | Return | Return |
| 20. | AUX_PWR | AUX_PWR |

Digital Interactive Interface for Video & Audio (DiiVA™) is a standard that supports an interface for interactive consumer electronics and home networking. The Digital Interactive Interface for Video & Audio (DiiVA™) combines a reliable high-speed, bi-directional data channel in addition to an uncompressed video and audio channel over a single interface. The DiiVA™ interface allows users to connect, configure, and control various home consumer electronic devices (e.g., Blueray player, a game console, etc.) from their Digital TVs. The Digital Interactive Interface for Video & Audio (DiiVA™) is primarily intended to be for connectivity of consumer electronic devices in the home. The Digital Interactive Interface for Video & Audio (DiiVA™) standard is fully described in the "DiiVA Specification Release Candidate", version 1.1 published on Oct. 5, 2010, by the China Video Industry Association, incorporated herein by reference in its entirety merely for the useful understanding of the background of the invention.

Transport channels of the Digital Interactive Interface for Video & Audio (DiiVA™) interface include a main link and a hybrid link. The main link is a unidirectional channel that allows data transfers over 3 lanes that carry clock signals in addition to the video streams. Each lane is an AC-coupled differential pair. The hybrid channel is a bi-directional high speed channel that carries an audio packet, and a control and data packet, such as Ethernet and USB, over both the video and hybrid channels. The Digital Interactive Interface for Video & Audio (DiiVA™) includes a Power over Digital Interactive Interface for Video & Audio (DiiVA™) (PoD) mechanism that enables a device-to-device charging power. The Digital Interactive Interface for Video & Audio (DiiVA™) interface is facilitated using a standard twisted pair cable, such as a CAT6, CAT 6A and CAT 7 and the Digital Interactive Interface for Video & Audio (DiiVA™) specific connectors. Each Digital Interactive Interface for Video & Audio (DiiVA™) connector includes 13 pins. Source and sink connectors have the same configuration. Table 3 lists pins in a type A Digital Interactive Interface for Video & Audio (DiiVA™) connector (either a source or sink).

TABLE 3

| Pin Number | DiiVA Source/Sink |
|---|---|
| 1. | GND |
| 2. | VL2+ |
| 3. | VL2− |
| 4. | GND |
| 5. | VL1+ |
| 6. | VL1− |
| 7. | GND |
| 8. | VL0+ |
| 9. | VL0− |
| 10. | GND |
| 11. | GND |
| 12. | HL+ |
| 13. | HL− |

Universal Serial Bus (USB) standard was designed to establish communication between devices and a host controller of a PC. The USB can connect computer peripherals, such as mice, keyboards, digital cameras, printers, personal media players, flash drives, network adapters, external hard drives, and the like. The USB was designed for personal computers, but it has become commonplace on handheld devices, such as mobile phones, smartphones, PDAs, tablet computers, and video game consoles. The USB can also serve as a power cord for charging such devices. For many types of handheld devices, the USB has become the only standard interface. The USB 2 standard for Low Speed (1.5M), Full Speed (12M) and High Speed (480M) over D± is fully described in the USB 2.0 Specification Revision 2.0 published Apr. 27, 2000. USB 3 standard, which adds Super Speed (5 Gbps) over USB 2, is fully described in the USB 3.0 Specification Revision 1.0 published Nov. 12, 2008.

There are several types of USB connectors; the most common are Standard-A plugs and receptacles. The data connectors in the Standard-A plug are recessed in the plug as compared to the outside power connectors. This permits the power to connect first, thus preventing data errors by allowing the device to power up first and then transfer data. The pinout of a Standard-A plug and receptacle as defined in the USB 3.0 specification is detailed in Table 4.

TABLE 4

| Pin Number | Pin Name | Function |
|---|---|---|
| 1. | VBUS | Power |
| 2. | D− | USB 2 Diff pair |
| 3. | D+ | |
| 4. | GND | Ground for power return |
| 5. | StdA_SSRX− | Super speed RX diff pair |
| 6. | StdA_SSRX+ | |
| 7. | GND_Drain | Ground for signal return |
| 8. | StdA_SSTX− | Super speed TX diff pair |
| 9. | StdA_SSTX+ | |
| 10. | Shield | |

Multimedia interfaces that allow dual connectivity of both HDMI and DisplayPort have been recently developed. Such interfaces can process data compliant with the HDMI and DisplayPort. An example for an interface that allows interoperability between HDMI and DisplayPort multimedia interfaces can be found in a co-pending U.S. patent application Ser. No. 12/558,673 (hereinafter the '673 application), assigned to the common assignee and incorporated herein by reference in its entirety merely for the useful understanding of the related art.

However, existing solutions do not support interoperability between data and multimedia interfaces (e.g., USB, DisplayPort, and HDMI). As mentioned above, handheld devices are typically equipped only with a USB connector, thus connecting such devices to a multimedia device may require a special adapter, and in many cases, such connectivity may not be feasible. For example, connecting a smartphone equipped with a USB connector to a projector having a HDMI connector currently is not feasible. Another example is that a smartphone equipped with an HDMI connector, which is used to transmit video/audio to an external display, cannot transmit or receive data, and thus an additional connector of a USB type is required for that purpose. Thus, a solution that would enable interoperability between data and multimedia interfaces, can provide great flexibility and benefit to users of at least handheld devices.

SUMMARY OF THE INVENTION

Certain embodiments disclosed herein include a triple-mode connectivity apparatus for enabling interoperability between a multimedia display interface and a data interface. The apparatus comprises a universal connector installed in a first device and structured to enable connectivity between the multimedia display interface and the data interface of a second device, the first device is connected to the second device using a cable having a first connector compliant with the universal connector and a second connecter compliant with the data interface of the second device; a physical layer interface for processing signals compliant with the multimedia display interface and the data interface; and a detector for detecting an interface type of the second device and setting the apparatus to process signals according to the determined interface type.

Certain embodiments disclosed herein also include a triple-mode connectivity apparatus for enabling interoperability between a multimedia display interface and a data interface. The apparatus comprises a universal connector installed in a first device and structured to enable connectivity between the triple-mode connectivity apparatus and a multimedia interface of a second device, the first device is connected to the second device using a cable having a first connector compliant with the universal connector and a second connecter compliant with a multimedia interface type of the second device, wherein the universal connector supports a plurality of multimedia display interfaces and the at least one data interface; a physical layer interface for processing signals compliant with the plurality of multimedia display interfaces and the data interface; and a detector for detecting an interface type of the second device and setting the apparatus to process signals according to the detected interface type.

Certain embodiments disclosed herein also include a multimedia-data interface cable. The cable comprises a universal connector including a plurality of contact pins providing connectivity for multimedia display interface signals and data interface signals; a second multimedia connector including a plurality of contact pins providing connectivity for any one of multimedia display interface signals and data interface signals; and a plurality of conducting wires for coupling the plurality of contact pins of the universal connector to the plurality of contact pins of the second multimedia connector to enable interoperability between a multimedia display interface and a data interface.

Certain embodiments disclosed herein also include a universal connector for enabling interoperability between a multimedia display interface and a data interface. The connector includes a housing; and a plurality of contact pins arranged in the housing, wherein the plurality of pins provide connectivity for multimedia display interface signals and data interface signals.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
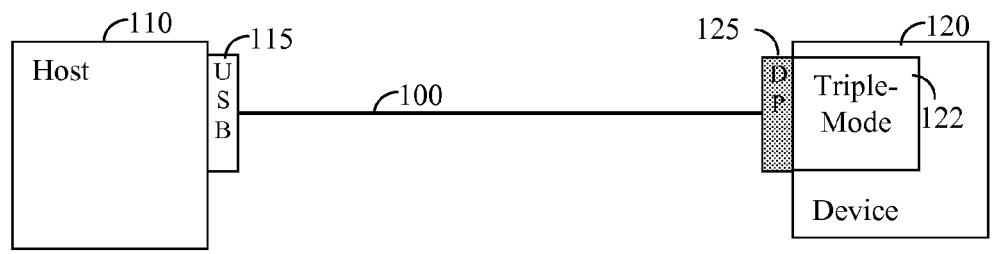
FIG. 1 is a schematic diagram illustrating the connection between a USB device and a DisplayPort device using a cable designed according to an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments, complete interoperability can be achieved between data interfaces, such as USB connectors, and multimedia interfaces such as HDMI and DisplayPort. That is, a device having a USB connector can be connected to a device having a USB, DisplayPort, Digital Interactive Interface for Video & Audio (DiiVA™), or HDMI connector. In addition, a device having a HDMI connector can be connected to a device having a USB, DisplayPort or HDMI connector, and a device having a DisplayPort connector can be connected to a device having a USB, DisplayPort, or HDMI connector. The interoperability between DisplayPort and HDMI interfaces is described in detail in the '673 patent application referenced above.

In another embodiment, a special type of connector is defined, hereinafter the "Unified/Universal Connector" or UNICONN connector. According to this embodiment, a connection between a device having a UNICONN connector to a device having a USB, HDMI, DisplayPort, or UNICONN can be achieved using a data-multimedia cable.

One embodiment of the invention, illustrated in FIG. 1, includes a data-multimedia interface cable 100 that enables a proper connection between a USB compliant device 110 and a DisplayPort (DP) compliant device 120 that includes a triple-mode connectivity interface 122. The devices 110 and 120 respectively include a USB and DisplayPort connector 115 and 125.

The triple-mode connectivity interface 122 is a physical layer interface capable of processing HDMI, DisplayPort, or USB signals. In accordance with an embodiment, the triple-mode connectivity interface can be programmed manually to HDMI, DisplayPort or USB mode of operation. According to another embodiment, the triple-mode connectivity interface implements an automatic recognition mechanism for determining the type of the multimedia interface connected at the other end of the cable 100, and configuring the respective device accordingly. For example, if the device 110 supports a USB, the triple-mode connectivity interface 122 recognizes that USB data is transmitted by the device 110, and sets the sink device 110 to process such type of data. The automatic recognition mechanism is described in more detail below. It should be noted that the USB compliant devices 110 and 130 can function as either a USB host or a USB device as defined in the USB 3.0 specification.

The data-multimedia interface cable 100 provides a transport medium between two different types of interfaces: USB and DisplayPort. The cable 100 comprises a USB connector including 9 pins and a DisplayPort connector with 20 pins. The wiring between the USB and DisplayPort connectors is listed in Table 5.

TABLE 5

| Wire | DP connector Pin number | USB connector Pin number |
|---|---|---|
| 1) | 1 | 9 |
| 2) | 2, 5, 8, 11, 16 | 7 |
| 3) | 3 | 8 |
| 4) | 4 | 6 |
| 5) | 2, 5, 8, 11, 16 | 7 |
| 6) | 6 | 5 |
| 7) | Not connected (NC) | NC |
| 8) | 2, 5, 8, 11, 16 | 7 |
| 9) | NC | NC |
| 10) | NC | NC |
| 11) | 2, 5, 8, 11, 16 | 7 |

TABLE 5-continued

| Wire | DP connector Pin number | USB connector Pin number |
|---|---|---|
| 12) | NC | NC |
| 13) | NC | NC |
| 14) | NC | NC |
| 15) | 15 | 3 |
| 16) | 2, 5, 8, 11, 16 | 7 |
| 17) | 17 | 2 |
| 18) | NC | NC |
| 19) | 19 | 4 |
| 20) | 20 | 1 |

It should be noted that the indicated pin numbers are only examples used for ease of understanding. One of ordinary skill in the art recognizes that the pin assignments may be designed to be in any location based on design expediency. It should be further noted that one of ordinary skill in the art would recognize that the embodiment described in FIG. 1 and Table 4 can be adapted to other types of USB connectors, for example, USB 1.0 and 2.0 connector types.

The UNICONN connector is structured, in one embodiment, to include a plurality of contact pins and a housing (chassy) in which the pins are arranged. The pins, at one end, are connected to the triple-mode connectivity interface 120, and at another end to a contact plate into which a receptacle connector is inserted. In another embodiment, the UNICONN connector is structured to include a housing where the pins are arranged. The pins at one end are connected to the data-multimedia cable 100, and at another end, to the receptacle connector. The housing may be formed from a conductive material covered by a plastic cover.

The UNICONN connector, designed in accordance with an embodiment, includes 23 pins to transfer signals defined at least by any one of the HDMI, DisplayPort, Digital Interactive Interface for Video & Audio (DiiVA™), and USB interfaces. Specifically, each pin in the UNICONN connector serves a different function depending on the type of the connectivity of the device in which the UNICONN connector is installed. Table 6 lists the pins of the UNICONN and their signals of HDMI, USB, and DisplayPort interfaces.

TABLE 6

| Pin Number | HDMI (Source/Sink) | DP Source | DP Sink | USB | DiiVA STP type cable |
|---|---|---|---|---|---|
| 1. | Not connected (NC) | NC | NC | USB3 RXP | NC |
| 2. | NC | NC | NC | GND | NC |
| 3. | NC | NC | NC | USB3 RXN | NC |
| 4. | TMDS_Data2+ | ML_lane0P | ML_lane3N | USB3 TXP | HL+ |
| 5. | Shield | GND | GND | GND Drain | GND |
| 6. | TMDS_Data2− | ML_lane0N | ML_lane3P | USB3 TXN | HL− |
| 7. | TMDS_Data1+ | ML_lane1P | ML_lane2N | NC | VL0+ |
| 8. | Shield | GND | GND | GND Drain | NC |
| 9. | TMDS_Data1− | ML_lane1N | ML_lane2P | NC | VL0− |
| 10. | TMDS_Data0+ | ML_lane2P | ML_lane1N | NC | VL1+ |
| 11. | Shield | GND | GND | GND Drain | GND |
| 12. | TMDS_Data0− | ML_lane2N | ML_lane1P | NC | VL1− |
| 13. | TMDS_Clk+ | ML_lane3P | ML_lane0N | NC | VL2+ |
| 14. | Shield | GND | GND | GND Drain | GND |
| 15. | TMDS_Clk− | ML_lane3N | ML_lane0P | NC | VL2− |
| 16. | CEC | Config1 | Config1 | NC | NC |
| 17. | Utility | Config2 | Config2 | NC | NC |
| 18. | SCL | AUX_CHP | AUX_CHP | D+ | D+ |
| 19. | SDA | GND | GND | GND Drain | NC |
| 20. | DDC/CEC/Ground | AUX_CHN | AUX_CHN | D− | D− |
| 21. | +5 V | HPD | HPD | VBUS | VBUS |
| 22. | HPD | Return | Return | GND | GND |
| 23. | NC | AUX_PWR | AUX_PWR | NC | NC |

Because the connectivity of sink and source DisplayPort connectors is not the same, the UNICONN connector supports both configurations. It should be noted that the indicated pin numbers are only examples used for ease of understanding. One of ordinary skill in the art recognizes that the pin assignments may be designed to be in any location based on design expediency.

In accordance with another embodiment, the UNICONN connector includes 19 pins. Table 7 lists the pins of the UNICONN and their signals of HDMI, Digital Interactive Interface for Video & Audio (DiiVA™), USB, and DisplayPort interfaces.

TABLE 7

| Pin Number | HDMI | DisplayPort | USB | DiiVA (STP) |
|---|---|---|---|---|
| 1. | TMDS_Data2+ | ML_lane3N | stdX_SSRX− | HL+ |
| 2. | Shield | GND | GND | GND |
| 3. | TMDS_Data2− | ML_lane3P | stdX_SSRX+ | HL− |
| 4. | TMDS_Data1+ | ML_lane2N | stdX_SSTX− | VL0+ |
| 5. | +5 V | DP_PWR | NC | NC |
| 6. | TMDS_Data1− | ML_lane2P | stdX_SSTX+ | VL0− |
| 7. | TMDS_Data0+ | ML_lane1N | Not connected (NC) | VL1+ |
| 8. | Shield | GND | GND Drain | GND |
| 9. | TMDS_Data0− | ML_lane1P | NC | VL1− |
| 10. | TMDS_Clk+ | ML_lane0N | NC | VL2+ |
| 11. | Shield | GND | GND Drain | GND |
| 12. | TMDS_Clk− | ML_lane0P | NC | VL2− |
| 13. | D− | D− | D− | D− |
| 14. | D+ | D+ | D+ | D+ |
| 15. | SDA | AUX_CHP | NC | NC |
| 16. | SCL | AUX_CHN | NC | NC |
| 17. | DDC/CEC Ground | Return | GND | GND |
| 18. | VBUS | VBUS | VBUS | VBUS |
| 19. | CEC | HPD | NC | NC |

In accordance with another embodiment, the UNICONN connector includes 16 pins. Table 8 lists the pins of the UNICONN and their signals of HDMI, Digital Interactive Interface for Video & Audio (DiiVA™), USB, and DisplayPort interfaces. It should be noted that the pin reduction is due to the use of the body connector (chassy) as the reference Ground conductor.

TABLE 8

| Pin Number | HDMI | DP | USB | DiiVA (STP) |
|---|---|---|---|---|
| 1. | TMDS_Data2+ | ML_lane3N | stdX_SSRX− | HL+ |
| 2. | TMDS_Data2− | ML_lane3P | stdX_SSRX+ | HL− |
| 3. | TMDS_Data1+ | ML_lane2N | stdX_SSTX− | VL0+ |

TABLE 8-continued

| Pin Number | HDMI | DP | USB | DiiVA (STP) |
|---|---|---|---|---|
| 4. | +5 V | DP_PWR | NC | NC |
| 5. | TMDS_Data1− | ML_lane2P | stdX_SSTX+ | VL0− |
| 6. | TMDS_Data0+ | ML_lane1N | NC | VL1+ |
| 7. | TMDS_Data0− | ML_lane1P | NC | VL1− |
| 8. | TMDS_Clk+ | ML_lane0N | NC | VL2+ |
| 9. | TMDS_Clk− | ML_lane0P | NC | VL2− |
| 10. | D− | D− | D− | D− |
| 11. | D+ | D+ | D+ | D+ |
| 12. | SDA | AUX_CHP | NC | NC |
| 13. | SCL | AUX_CHN | NC | NC |
| 14. | DDC/CEC Ground | Return | GND | GND |
| 15. | VBUS | VBUS | VBUS | VBUS |
| 16. | CEC | HPD | NC | NC |

It should be noted that the indicated pin numbers in tables 6, 7, and 8 are only examples used for ease of understanding. One of ordinary skill in the art recognizes that the pin assignments may be designed to be in any location based on design expediency.

Figure 2A:
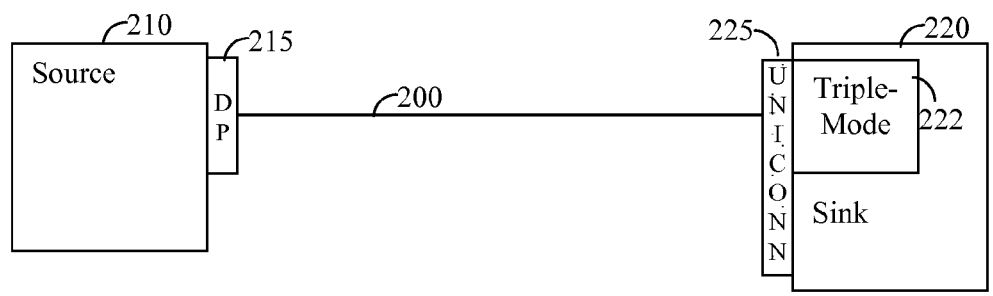
FIGS. 2A and 2B are schematic diagrams illustrating the connection between a UNICONN device and a DisplayPort device using a cable designed according to an embodiment of the invention.

FIG. 2A shows a connectivity connection between a DisplayPort source compliant device 210 and a sink device 220 that includes a triple-mode connectivity interface 222. The devices 210 and 220 respectively interface using a DisplayPort and UNICONN connector 215 and 225. The triple-mode connectivity interface 222 operates as the interface 122 mentioned above.

Figure 2B:
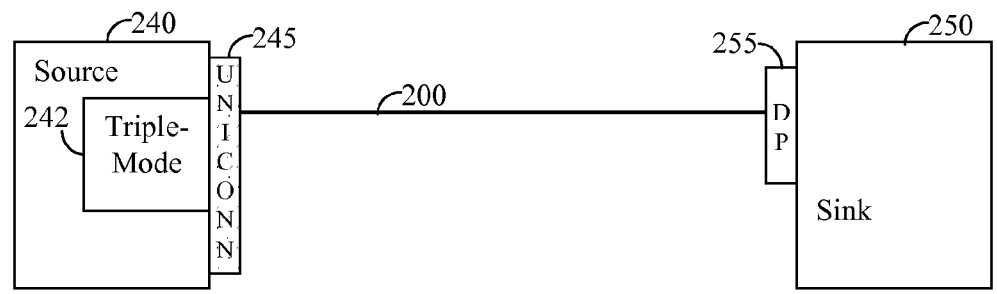

A proper connection between devices 210 and 220 is enabled by means of the data-multimedia interface cable 200, which is constructed in accordance with an embodiment of the invention. Specifically, the cable 200 provides a transport medium between two different types of interfaces: UNICONN and DisplayPort. As shown in FIG. 2B, the cable 200 can be also utilized to connect a source device 240 that includes a triple-mode connectivity interface 242 to a DisplayPort compliant sink device 250. The devices 240 and 250 respectively include a UNICONN connector and DisplayPort connector 245 and 255.

The cable 200 comprises, at one end, a UNICONN connector including 23 pins and, at the other end, a DisplayPort connector with 20 pins. The wiring between the UNICONN and DisplayPort connectors is listed in Table 9.

TABLE 9

| Wire | UNICONN Connector Pin Number | DP Connector Pin Number |
|---|---|---|
| 1) | NC | NC |
| 2) | NC | NC |
| 3) | NC | NC |
| 4) | 4 | 1 |
| 5) | 2, 5, 8, 11, 14, 19 | 2, 5, 8, 11, 16 |
| 6) | 6 | 3 |
| 7) | 7 | 4 |
| 8) | 2, 5, 8, 11, 14, 19 | 2, 5, 8, 11, 16 |
| 9) | 9 | 6 |
| 10) | 10 | 7 |
| 11) | 2, 5, 8, 11, 14, 19 | 2, 5, 8, 11, 16 |
| 12) | 12 | 9 |
| 13) | 13 | 10 |
| 14) | 2, 5, 8, 11, 14, 19 | 2, 5, 8, 11, 16 |
| 15) | 15 | 12 |
| 16) | 16 | 13 |
| 17) | 17 | 14 |
| 18) | 18 | 15 |
| 19) | 2, 5, 8, 11, 14, 19 | 2, 5, 8, 11, 16 |
| 20) | 20 | 17 |
| 21) | 21 | 18 |
| 22) | 22 | 19 |
| 23) | 23 | 20 |

For example, as shown in Table 9, wire number 4) connects pins 4 and 1 in the UNICONN and DP connectors respectively, wire number 5) connects pins 2, 5, 8, 11, 14, 19 (all pins are short-circuit) and pins 2, 5, 8, 11, 16 (pins are short-circuit) in the UNICONN and DP connectors respectively, and so on. It should be noted that the indicated pin numbers are only examples used for ease of understanding. One of ordinary skill in the art recognizes that the pin assignments may be designed to be in any location based on design expediency.

Figure 3A:
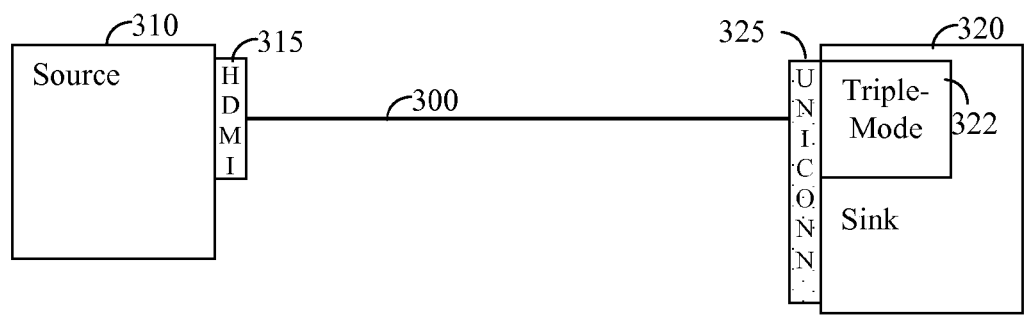
FIGS. 3A and 3B are schematic diagrams illustrating the connection between a UNICONN device and a HDMI device using a cable designed according to an embodiment of the invention.

FIG. 3A shows a connection between a HDMI source compliant device 310 and a sink device 320 that includes a triple-mode connectivity interface 322. The devices 310 and 320 respectively include a HDMI and UNICONN connector 315 and 325. The triple-mode connectivity interface 322 operates as the interface 122 mentioned above.

A proper connection between devices 310 and 320 is enabled by means of the data-multimedia interface cable 300, constructed in accordance with an embodiment of the invention. Specifically, the cable 300 provides a transport medium between two different types of interfaces: UNICONN and HDMI.

Figure 3B:
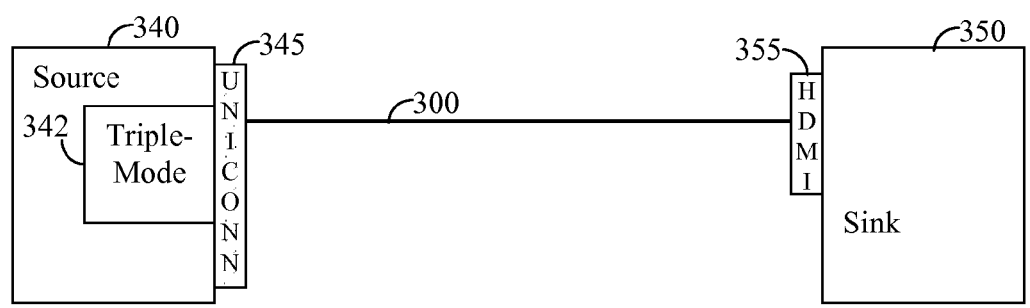

As shown in FIG. 3B, the cable 300 can be also utilized to connect a source device 340 that includes a triple-mode connectivity interface 342 to a HDMI compliant sink device 350. The devices 340 and 350 respectively include a UNICONN connector and HDMI connector 345 and 355.

The cable 300 comprises, at one end, a UNICONN connector including 23 pins and a HDMI connector with 19 pins at the other end. The wiring between the UNICONN and HDMI connectors is listed in Table 10.

TABLE 10

| Wire | UNICONN Pin number | HDMI connector Pin Number |
|---|---|---|
| 1) | NC | NC |
| 2) | NC | NC |
| 3) | NC | NC |
| 4) | 4 | 1 |
| 5) | 2, 5, 8, 11, 14, 19 | 2, 5, 8, 11 |
| 6) | 6 | 3 |
| 7) | 7 | 4 |
| 8) | 2, 5, 8, 11, 14, 19 | 2, 5, 8, 11 |
| 9) | 9 | 6 |
| 10) | 10 | 7 |
| 11) | 2, 5, 8, 11, 14, 19 | 2, 5, 8, 11 |
| 12) | 12 | 9 |
| 13) | 13 | 10 |
| 14) | 2, 5, 8, 11, 14, 19 | 2, 5, 8, 11 |
| 15) | 15 | 12 |
| 16) | 16 | 14 |
| 17) | 17 | 13 |
| 18) | 18 | 15 |
| 19) | 2, 5, 8, 11, 14, 19 | 2, 5, 8, 11 |
| 20) | 20 | 16 |
| 21) | 21 | 19 |
| 22) | 22 | 17 |
| 23) | 23 | 18 |

For example, as listed in Table 10, wire number 20) connects pins 20 and 16 in the UNICONN and HDMI connectors respectively, wire number 21) connects pin 21 and pin 19 in the UNICONN and HDMI connectors respectively, and so on. It should be noted that the indicated pin numbers are only examples used for ease of understanding. One of ordinary skill in the art recognizes that the pin assignments may be designed to be in any location based on design expediency.

Figure 4A:
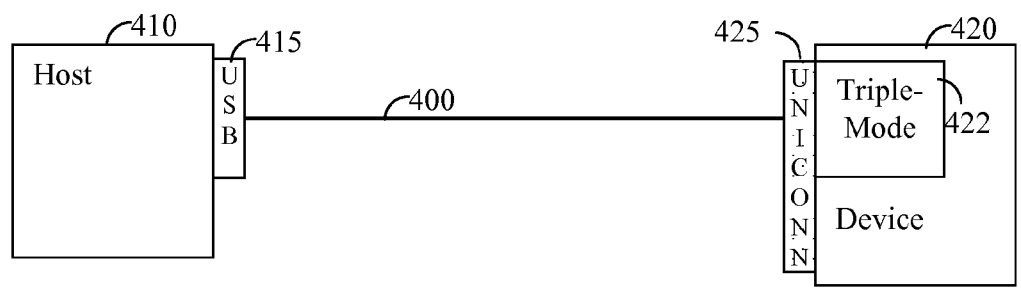
FIGS. 4A and 4B are schematic diagrams illustrating the connection between a UNICONN device and a USB device using a cable designed according to an embodiment of the invention.

FIG. 4A shows a connection between a host 410 equipped with a USB connector 415 and a device 420 that includes a UNICONN connector 425 and a triple-mode connectivity interface 422. The triple-mode connectivity interface 422 operates as the interface 122 mentioned above.

Figure 4B:
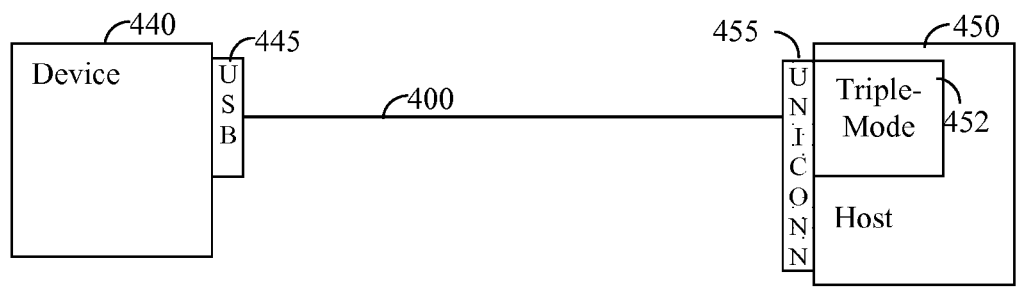

FIG. 4B shows a connection between a device 440 equipped with a USB connector 445 and a host 450 that includes a UNICONN connector 455 and a triple-mode connectivity interface 452. The triple-mode connectivity interface 452 operates as the interface 122 mentioned above.

A proper connection between the host 410 and device 420 or the host 450 and device 440 is enabled by means of the data-multimedia interface cable 400, constructed in accordance with an embodiment of the invention. Specifically, the cable 400 provides a transport medium between two different types of interfaces: UNICONN and USB. The cable 400 comprises, at one end, a UNICONN connector including 23 pins and, at the other end, a USB connector with 9 pins. The wiring between the UNICONN and HDMI connectors is listed in Table 11.

TABLE 11

| Wire | UNICONN Connector Pin Number | USB Connector Pin Number |
|---|---|---|
| 1) | 1 | 6 |
| 2) | 2, 5, 8, 11, 14, 19 | 4 |
| 3) | 3 | 5 |
| 4) | 4 | 9 |
| 5) | 2, 5, 8, 11, 14, 19 | 4 |
| 6) | 6 | 8 |
| 7) | NC | NC |
| 8) | 2, 5, 8, 11, 14, 19 | 4 |
| 9) | 9 | NC |
| 10) | NC | NC |
| 11) | 2, 5, 8, 11, 14, 19 | 4 |
| 12) | NC | NC |
| 13) | NC | NC |
| 14) | 2, 5, 8, 11, 14, 19 | 4 |
| 15) | NC | NC |
| 16) | NC | NC |
| 17) | NC | NC |
| 18) | 18 | 3 |
| 19) | 2, 5, 8, 11, 14, 19 | 4 |
| 20) | 20 | 2 |
| 21) | 21 | 1 |
| 22) | 22 | 4 |
| 23) | NC | NC |

For example, as shown in Table 11, wire number 1) connects pins 1 and 6 in the UNICONN and USB connectors respectively, wire number 5) connects pins 2, 5, 8, 11, 14, 19 (all pins are short-circuit) and pin 4 in the UNICONN and USB connectors respectively, and so on. It should be noted that the indicated pin numbers are only examples used for ease of understanding. One of ordinary skill in the art recognizes that the pin assignments may be designed to be in any location based on design expediency. It should be further noted that one of ordinary skill in the art would recognize that the embodiment described in FIG. 4 and Table 11 can be adapted to other types of USB connectors, for example, USB 1.0 and USB 2.0 connector types.

In accordance with another embodiment of the invention, a data-multimedia interface cable is designed to provide a transport medium between two devices, each of which are equipped with UNICONN connectors. The wiring of such cable may include a connection between the respective pins at each connector.

Figure 5:
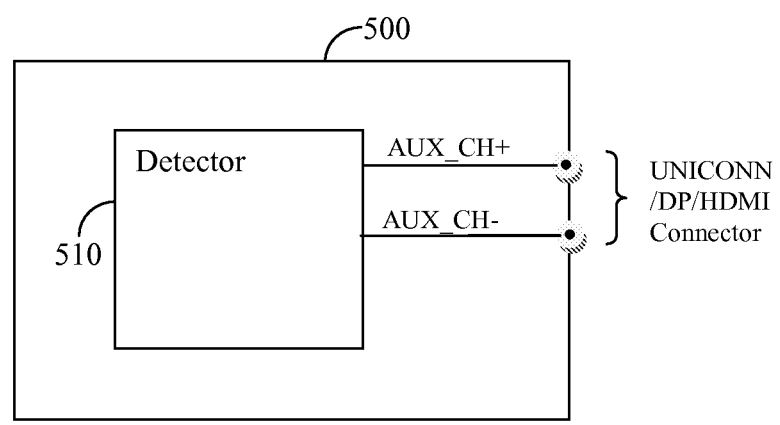
FIG. 5 is a schematic diagram of a triple-mode connectivity interface adapted to perform source recognition in accordance with an embodiment of the invention.

FIG. 5 shows an exemplary diagram illustrating the automatic recognition of a type of an interface connected to the triple-mode connectivity interface 500. In accordance with this embodiment, the interface 500 is installed in a sink device or USB device and is capable of source or USB host recognition, respectively, by means of sensing the auxiliary channel.

Specifically, a detector 510 implements the sensing of an auxiliary channel using a logic circuit (not shown) that generates a decision regarding the type of a source device based on the logic values of the signals AUX_CHP and AUX_CHN (e.g., pins 18 and 20 in the UNICONN connector and pins 15 and 17 in a DP/HDMI connector). The logic circuit in the detector 510 also identifies a specific data pattern transmitted by a USB device. The data pattern is defined in the USB 3.0 specification. Thus, based on the logic values of the both AUX_CHP and AUX_CHN signals and the existence of the USB data pattern, the type of the interface of a source device can be detected.

Specifically, if a logic value of both signals AUX_CHP and AUX_CHN is '0' and the USB data pattern is detected, the source device is a USB device; otherwise, the source device is not being powered; if the value of AUX_CHP is '0' and the value of the AUX_CHN is '1' the source is a DisplayPort device; if the logic values of AUX_CHP and AUX_CHN are '1' and '0' respectively, no device is connected at the other end of the cable; and if a logic value of both AUX_CHP and AUX_CHN is '1', the source is a HDMI device. It should be noted that the indicated logic values of '1' and '0' and voltage values of the predefined threshold are only examples used for ease of understanding. One of ordinary skill in the art recognizes that the value may be designed to be any value based on design expediency.

Upon recognition of the type of a source device, the triple-mode connectivity interface 500 is set to be compliant with the interface type of the source device. This includes, for example, setting analog circuits of an analog front-end of the interface 500 to a mode of operation compliant with the source device.

It should be appreciated that for the data-multimedia interface cables described above, the UNICONN connector and the automatic recognition mechanism provide complete interoperability among at least HDMI, USB, and DisplayPort interfaces. Specifically, the teachings of the invention disclosed herein can be utilized to connect a DisplayPort or HDMI compliant device to a USB compliant device. Therefore, enabling connectivity, for example, between a handheld device with a USB connector and a projector equipped with a DisplayPort connector using the data-multimedia cable 100 is achieved.

While the present invention has been described at some length and with some particularity with respect to the several described embodiments, it is not intended that it should be limited to any such particulars or embodiments or any particular embodiment. Furthermore, the foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What is claimed is:

1. A triple-mode connectivity apparatus installed in a first device for enabling interoperability between a multimedia display interface associated with the first device and a data interface of a second device connected to the first device, the triple-mode connectivity apparatus comprising:
a universal connector structured to enable connectivity between the multimedia display interface and the data interface of the second device,
wherein the first device including the triple-mode connectivity apparatus is connected to the second device using a cable having a first connector compliant with the universal connector of the triple-mode connectivity apparatus and a second connecter compliant with the data interface of the second device;
a physical layer interface for processing digital signals compliant with the multimedia display interface of the first device and the data interface of the second device; and
a detector for: (a) detecting an interface type, from the plurality of data interface types, of the second device based on signals between the universal connector and the second connector; and (b) setting the triple-mode connectivity apparatus to process signals according to the detected interface type.

2. The apparatus of claim 1, wherein the universal connector enables connectivity of at least one of: a universal serial bus (USB) interface, a high-definition multimedia interface (HDMI), a digital interactive interface for video & audio (DiiVA) interface, and a DisplayPort interface.

3. The apparatus of claim 1, wherein the multimedia display interface is a HDMI and the data interface is a USB interface, wherein the cable includes at one end the universal connector and at the other end a USB connector.

4. The apparatus of claim 1, wherein the multimedia display interface is a DisplayPort interface and the data interface is a USB interface, wherein the cable includes at one end the universal connector and at the other end a USB connector.

5. The apparatus of claim 1, wherein the multimedia display interface is a DiiVA interface and the data interface is a USB interface, wherein the cable includes at one end the universal connector and at the other end a USB connector.

6. The apparatus of claim 2, wherein the USB interface is any one of: a USB 3.0 type interface, a USB 2.0 type interface, and a USB 1.0 type interface.

7. The apparatus of claim 2, wherein the universal connector includes at least: a housing and a plurality of contact pins arranged in the housing, wherein each pin of the plurality of pins serves a different connectivity function depending on an interface connectivity type of the first and the second devices.

8. The apparatus of claim 7, wherein the plurality of contact pins include any arrangement of any one of: 23 pins, 19 pins, and 16 pins.

9. The apparatus of claim 8, wherein different connectivity functions of the plurality of contact pins are of at least connectivity functions associated with at least one of: a DisplayPort source, a DisplayPort sink, a HDMI interface, a DiiVA interface, and a USB interface.

10. The apparatus of claim 1, wherein the second device is any one of a USB device and a USB host.

11. A triple-mode connectivity apparatus for enabling interoperability between a multimedia display interface and a data interface, comprising:
a universal connector installed in a first device and structured to enable connectivity between the triple-mode connectivity apparatus installed in the first device and a multimedia interface of a second device, the first device is connected to the second device using a cable having a first connector compliant with the universal connector and a second connecter compliant with a multimedia interface type of the second device, wherein the universal connector supports a plurality of multimedia display interfaces and the at least one data interface;
a physical layer interface for processing digital signals compliant with the plurality of multimedia display interfaces and the data interface; and
a detector for: (a) detecting an interface type from the plurality of data interface types, of the second device based on signals passing between the universal connector and the second connector and (b) setting the triple-mode connectivity apparatus to process signals according to the detected interface type.

12. The apparatus of claim 11, wherein the plurality of multimedia display interfaces include at least one of a high-definition multimedia interface (HDMI), a Digital Interactive Interface for Video & Audio (DiiVA), and a DisplayPort, and the data interface is a Universal Serial Bus (USB) interface.

13. The apparatus of claim 12, wherein the first device is a sink device and the multimedia display interface of the second device is a DisplayPort.

14. The apparatus of claim 12, wherein the first device is a source device and the multimedia display interface of the second device is a DisplayPort.

15. The apparatus of claim 12, wherein the first device is a sink device and the multimedia display interface of the second device is a HDMI.

16. The apparatus of claim 12, wherein the first device is a source device and the multimedia display interface of the second device is a HDMI.

* * * * *